(12) United States Patent
Brandys et al.

(10) Patent No.: US 10,055,393 B2
(45) Date of Patent: Aug. 21, 2018

(54) DISTRIBUTED VERSION CONTROL OF ORCHESTRATION TEMPLATES

(71) Applicant: International Business Machines Corporation, Armonk, NY (US)

(72) Inventors: Szymon Brandys, Cracow (PL); Konrad Gorzelanski, Cracow (PL); Marcin Lewandowski, Cracow (PL); Michal Zarakowski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 14/639,148

(22) Filed: Mar. 5, 2015

(65) Prior Publication Data

US 2016/0259795 A1    Sep. 8, 2016

(51) Int. Cl.
| | | |
|---|---|---|
| *G06F 17/22* | (2006.01) | |
| *G06F 17/24* | (2006.01) | |
| *G06F 17/30* | (2006.01) | |
| *G07F 17/24* | (2006.01) | |

(52) U.S. Cl.
CPC ........ *G06F 17/2288* (2013.01); *G06F 17/248* (2013.01); *G06F 17/30011* (2013.01)

(58) Field of Classification Search
CPC ................................................ G06F 17/30076
See application file for complete search history.

(56) References Cited

U.S. PATENT DOCUMENTS

| | | | |
|---|---|---|---|
| 2013/0111033 A1 | 5/2013 | Mao et al. | |
| 2013/0254699 A1* | 9/2013 | Bashir | G06F 3/0481 |
| | | | 715/772 |
| 2013/0290952 A1* | 10/2013 | Childers, Jr. | G06F 9/5077 |
| | | | 718/1 |

(Continued)

FOREIGN PATENT DOCUMENTS

| | | |
|---|---|---|
| WO | 2014007811 A1 | 1/2014 |
| WO | 2014058411 A1 | 4/2014 |

OTHER PUBLICATIONS

Liu et al., "Cloud Resource Orchestration: A Data-Centric Approach," 5th Biennial Conference on Innovative Data Systems Research (CIDR '11), Jan. 9-12, 2011, pp. 241-248.

(Continued)

*Primary Examiner* — James J Debrow
(74) *Attorney, Agent, or Firm* — Anthony R. Curro

(57) ABSTRACT

Distributed version control in a multi-region cloud in which each region includes an instance of a version control service. A first version control service in a first region receives an indicator to re-version a document saved in the first cloud region. For re-versioning due to creation of a new version of the document in the first cloud region, first version control service re-versions the document by saving the created new version of the document in the first cloud region. The first version control service identifies access information to a second version control service in a second cloud region and transmits the re-versioned document to the second version control service. For a re-versioning due to receiving a new (Continued)

version of the document from a second version control service, the first version control service re-versions the document by saving the received new version of the document in the first cloud region.

20 Claims, 6 Drawing Sheets

(56) References Cited

U.S. PATENT DOCUMENTS

2014/0074973 A1 3/2014 Kumar et al.
2016/0352836 A1* 12/2016 Kamalakantha ...... G06F 17/303

OTHER PUBLICATIONS

Overture Networks, Inc., "Ensemble Service Orchestrator (ESO), Multi-Vendor NFV Service Management and Orchestration System," Datasheet, 2014, ESO-DS-043014, http://www.overturenetworks.com/sites/default/files/data_sheet/Overture_ESO_DS.pdf.

Binz et al., "TOSCA: Portable Automated Deployment and Management of Cloud Applications," Institute of Architecture of Application Systems, Advanced Web Services, Jan. 2014, pp. 527-549.

The Open Group, "The Nexus of Forces in Action—Use-Case 7: Multi-Service," A White Paper by: Members of the Open Platform 3.0 Forum, a Forum of The Open Group Led by Mark Skilton, Synthetic Spheres Ltd., Mar. 2014, http://www.opengroup.org/openplatform3.0/docs/Use-Cases/uc7.htm, pp. 1-3.

Amazon Web Services, "Amazon Elastic Compute Cloud; User Guide for Linux," Regions and Availability Zones, API Version Oct. 1, 2014, pp. 7-14.

Openstack Foundation, "OpenStack Operations Guide," Chapter 5. Scaling, Nov. 24, 2014, http://docs.openstack.org/openstack-ops/content/scaling.html, Accessed on Feb. 26, 2015, pp. 1-6.

Wikipedia, The Free Encyclopedia, "Distributed Revision Control," http://en.wikipedia.org/wiki/Distributed_revision_control, Accessed on Nov. 26, 2014, pp. 1-5.

Wikipedia, The Free Encyclopedia, "Orchestration (Computing)," http://en.wikipedia.org/wiki/Orchestration_(computing), Accessed on Nov. 26, 2014, pp. 1-3.

Wikipedia, The Free Encyclopedia, "Revision Control," http://en.wikipedia.org/wiki/Revision_control, Accessed on Nov. 26, 2014, pp. 1-10.

Mell et al., "The NIST of Definition of Cloud Computing," National Institute of Standards and Technology, Information Technology Laboratory, Version 15, Oct. 7, 2009.

* cited by examiner

DISTRIBUTED VERSION CONTROL OF ORCHESTRATION TEMPLATES

BACKGROUND

The present disclosure relates generally to version control and more particularly to distributed version control of orchestration templates in a multi-region cloud environment.

Orchestration, in the cloud, is the coordination or integration of several services in order to expose them as a single service to a customer. The coordinated services may, together, support the automation of a business process. Cloud orchestration services configure, coordinate and manage the complex, cross domain (system, enterprise, and firewall) processes and interactions of those integrated services.

SUMMARY

Embodiments of the present invention disclose a method, computer program product, and system for distributed version control in a multi-region cloud, each region in the multi-region cloud including an instance of a version control service. A first version control service in a first region of a multi-region cloud receives an indicator that a document saved in the first cloud region is to be re-versioned. Based on the indicator indicating the document saved in the first cloud region is to be re-versioned due to the creation of a new version of the document in the first cloud region, the first version control service re-versions the document saved in the first cloud region by saving the created new version of the document in the first cloud region. The first version control service identifies access information to a second version control service in a second cloud region of the multi-region cloud and transmits the re-versioned document to the second version control service.

Based on the indicator indicating the document saved in the first cloud region is to be re-versioned due to receiving a new version of the document from a second version control service in a second cloud region of the multi-region cloud, the first version control service re-versions the document saved in the first cloud region by saving the received new version of the document in the first cloud region.

In another aspect of the present invention, based on the indicator indicating the document saved in the first cloud region is to be re-versioned if a version of a document saved in a second cloud region is a newer version of the document saved in the first cloud region, the first version control service identifies access information to a second version control service in a second cloud region of the multi-region cloud and obtains from the second version control service, a document saved in the second cloud region. Based on the document obtained from the second cloud region being a newer version of the document saved in the first cloud region, the first version control service re-versions the document saved in the first cloud region by saving the obtained document in the first cloud region.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
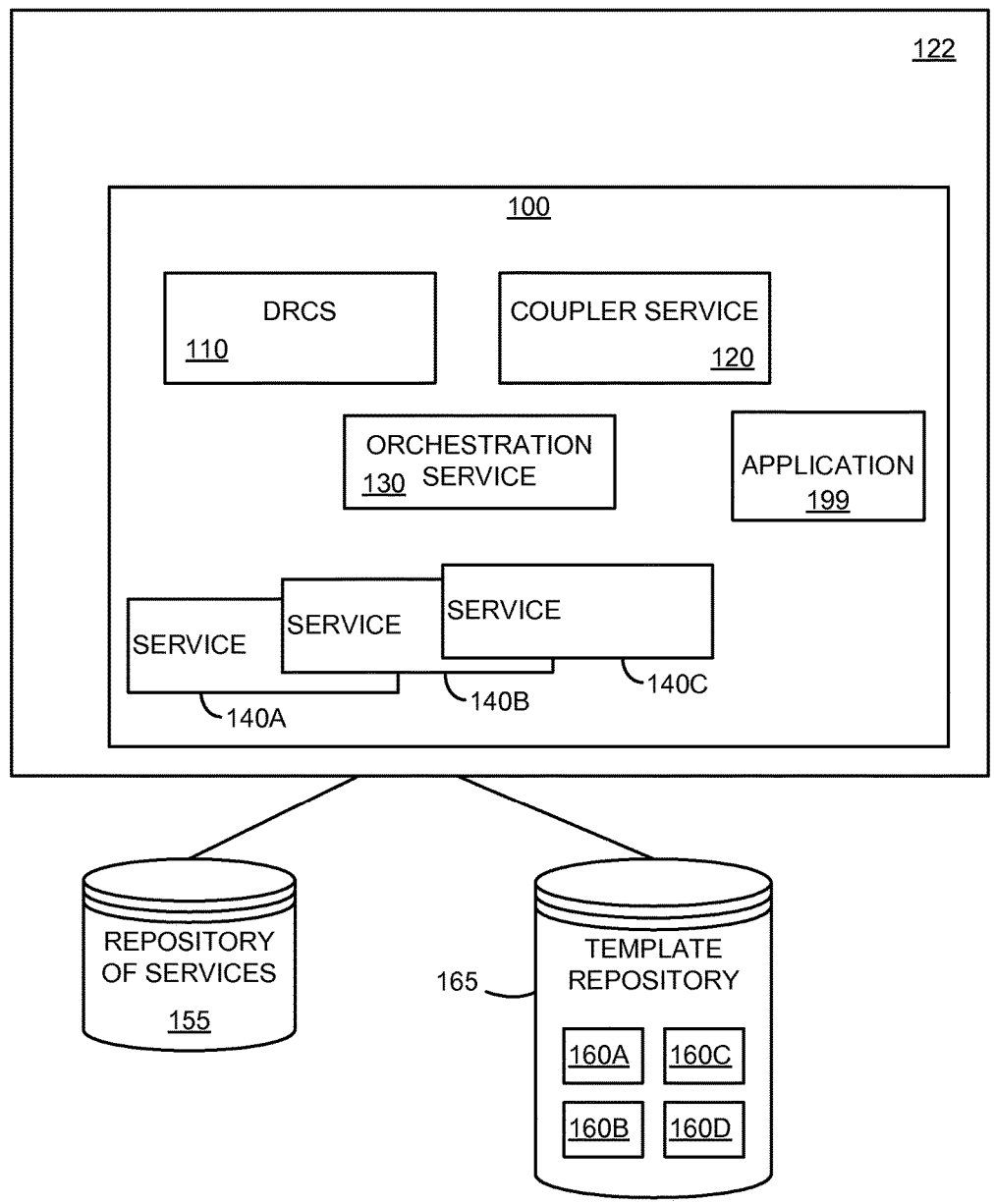
FIG. 1 illustrates a functional block diagram of an exemplary cloud computing node, in accordance with an embodiment of the present disclosure.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Various embodiments of the present disclosure provide a distributed revision control cloud service to the consumer that manages the life-cycle of a document in the cloud. In various embodiments, the distributed revision control cloud service may manage a document that ensures an application is deployed at a consistent version across the cloud.

FIG. 1 illustrates a functional block diagram of an exemplary cloud computing node 122, in accordance with an embodiment of the present disclosure. Cloud computing node 122 may include a cloud region 100, hereinafter "region", in which a cloud application 199 instance may be deployed. Region 100 may include a collection of cloud computing services 110, 120, 130, 140 and one or more deployed cloud applications 199, all of which may be stored, for example, on a computer readable storage medium, such as computer readable storage medium (media) 430 (FIG. 4), portable computer readable storage medium (media) 470, and/or RAM(S) 422. The cloud computing services in region 100 may include distributed revision control service (DRCS) 110, coupler service 120, orchestration service 130, and one or more platform, infrastructure, and/or application services 140A, 140B, 140C from the virtualization 70 (FIG. 6); management 80; and workload 90 functional cloud environment layers.

Figure 4:
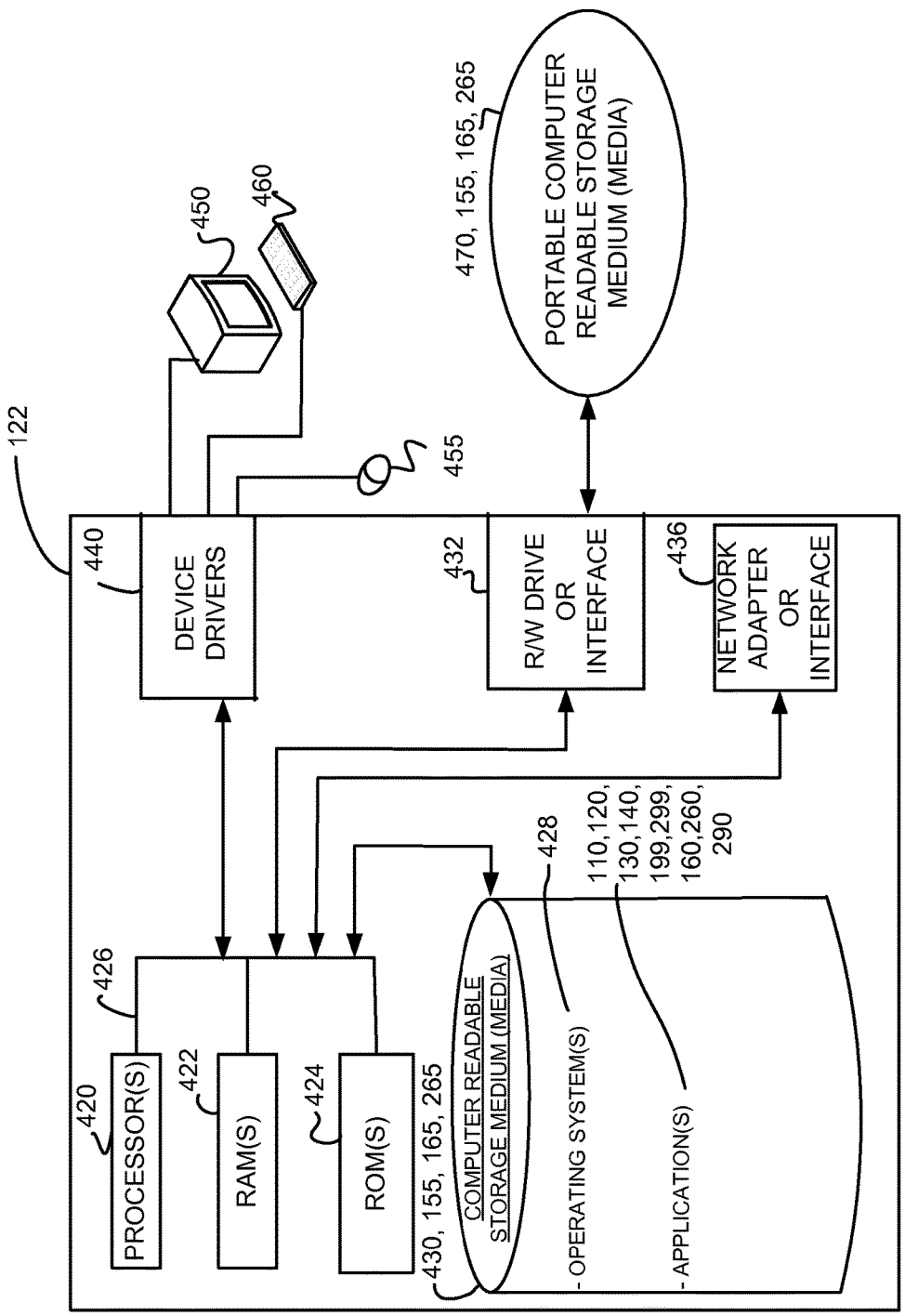
FIG. 4 depicts a block diagram of components of the computing device of FIG. 1, in accordance with an embodiment of the disclosure.

In certain embodiments, a cloud computing environment, hereinafter "cloud", may be comprised of a single self-sufficient region 100 on a cloud computing node 122. In other embodiments, a cloud may be comprised of a plurality of regions 100, each region 100 independent from the other regions 100 comprising that cloud. This plurality of independent regions 100 may reside on a single cloud computing node 122 or may reside on a plurality of cloud computing nodes 122 that are physically located in dispersed geographies. Though independent, the plurality of regions 100 in a cloud may be interconnected through a network (for example, the Internet, a local area network or other, wide area network or wireless network) and network adapter or interface 436 (FIG. 4). The network may comprise copper wires, optical fibers, wireless transmission, routers, firewalls, switches, gateway computers, and/or edge servers.

Region 100 may include various "region-wide services" such as DRCS 110, coupler service 120, and orchestration service 130 that work on behalf of the entire region 100. DRCS 110 and orchestration service 130 may manage the lifecycle of a cloud application 199, hereinafter "application", deployed in a region 100. In various embodiments, DRCS 110 may coordinate the management of an application's 199 lifecycle in the plurality of regions 100 in the cloud with deployed instances of application 199.

In various embodiments, orchestration service 130 may deploy an instance of the application 199 in region 100 by establishing, or provisioning, the application's 199 required infrastructure resources, such as data tier, middleware, and cloud services 140, in region 100, and by launching the application 199 to production. In various embodiments, a plurality of instances of an application 199 may be deployed in a plurality of regions 100, the orchestration service 130 in each region 100 provisioning the region 100 for its instance of the application 199.

Orchestration service 130 may utilize an orchestration template 160A, 160B, 160C, 160D, associated with the application 199, to determine the infrastructure resource requirements necessary to launch the application 199 into production in a region 100. In various embodiments, orchestration templates 160 may be human readable and writable text files describing the infrastructure resources and cloud computing services 110, 120, 130, 140 required for the application 199. The application 199 infrastructure resources described in orchestration template 160 may include, but are not limited to, servers, storage volumes, cloud services 140, and network connections. Orchestration templates 160 may also specify relationships between resources, such as identifying a particular storage volume that is to be connected to a particular server. Orchestration templates 160 used to establish the infrastructure for the deployed application 199 may be stored in template repository 165.

Template repository 165 may be locally attached to cloud computing node 122 or may be externally accessed through a network (for example, the Internet, a local area network or other, wide area network or wireless network) and network adapter or interface 436 (FIG. 4). The network may comprise copper wires, optical fibers, wireless transmission, routers, firewalls, switches, gateway computers, and/or edge servers. In various embodiments, template repository 165 may include orchestration templates 160 for all deployed applications 199 in a region 100 on a cloud computing node 122. In other embodiments, template repository 165 may be shared by a plurality of regions 100 on a plurality of computing nodes 122 in the same cloud and may include orchestration templates 160 for all the deployed applications 199 in all regions 100 in that cloud.

Over time, application 199 may be upgraded, or new versions may be developed, and the upgraded/new version of the application 199 may be deployed to the cloud. The upgraded or new version of the application 199 may require modifications to the infrastructure previously established in region 100 for that application 199. In order for the upgraded/new version of the application 199 to properly execute in the region 100, a new version of the orchestration template 160 describing the new infrastructure resource requirements may be used to deploy the upgraded/new version of the application 199. The new version of the orchestration template 160 may be added to template repository 165. Multiple versions of an orchestration template 160 for a single application 199 may be differentiated in template repository 165 with, for example version numbers or time stamps. In various embodiments, template repository 165 may include additional information for each orchestration template 160 in the template repository 165 including, but not limited to, orchestration template 160 history, and indicators if the version of the orchestration template 160 is the currently active version in any of the plurality of regions 100 in the cloud, and if so, in which region(s) 100.

Orchestration service 130 may manage the entire lifecycle of the application 199 in its region 100, including establishing the required infrastructure resources for a new instance of application 199, launching a new instance of application 199 to production, making infrastructure changes as described in modified versions of an orchestration template 160 for an upgraded/new version of an application 199, launching upgraded/new versions of an application 199 to production, and deleting all of an application's 199 infrastructure resources when the application 199 is removed from the region 100.

In various embodiments, DRCS 110 may manage the plurality of versions of the orchestration templates 160 for each deployed application 199 in region 100, including conflict management, and may coordinate the management of the entire lifecycle of the application 199 across the plurality of regions 100 in the cloud in which the application 199 is deployed. DRCS 110 may determine which version of an application's 199 orchestration template 160 is to be used by orchestration services 120 to deploy the application 199 in the region 100. DRCS 110 may provide an application programmer interface (API) to receive new versions of an orchestration template 160 to be added to template repository 165. DRCS 110 may, for example utilize a "check-out" and "check-in" API protocol to handle revision control of orchestration template 160 versions within the region 100 to avoid conflicting orchestration template 160 updates. In various embodiments, DRCS 110 may also provide an API, for example "push", that indicates a particular version of an orchestration template 160 to make the active version for an application 199 in the region 100. DRCS 110 may pass the indicated version of the orchestration template 160 to orchestration service 130, which may then deploy the application 199 using the version of the orchestration template 160 received from DRCS 110.

In various embodiments, DRCS 110 may provide an API, for example "cloud-push", to indicate a particular version of an orchestration template 160 is to be propagated to the plurality of regions 100 in the cloud as the active version for an application 199. In other embodiments, the push API may include flags that indicate the pushed version of the orchestration template 160 is to be propagated. DRCS 110 may communicate with other instances of DRCS 110 in other regions 110 in the same cloud to propagate the pushed orchestration template 160. DRCS 110 may call coupler service 120, described below, to identify and locate the other instances of DRCS 110 in the other regions 100 in the same cloud.

In various embodiments, DRCS 110 may register the other instances of DRCS 110 in the cloud as remote instances and issue a push API, for example over the cloud network, to the plurality of instances of DRCS 110 executing in the plurality of regions 100 in the same cloud to propagate the orchestration template 160 to the other regions 100. In various embodiments, DRCS 110 may include the requested orchestration template 160 itself in the API invocation. In other embodiments, DRCS 110 may include only the delta between any particular region's 110 active version of an orchestration template 160 and the version of the orchestration template 160 to be propagated.

In various embodiments, the DRCS 110 instance that received the cloud-push API invocation may invoke the push API of each of the plurality of DRCS 110 instances in the other regions 100 of the cloud, in sequence, including the delta between each region's 100 currently active orchestration template 160 for the application 199 and the orchestration template 160 to be propagated, in the push API invocation. Each of the plurality of DRCS 110 instances may verify no orchestration template 160 update conflicts occur in its region 100, and if no conflicts exist, pass the new version of orchestration template 160 to the instance of orchestration service 130 in its region 100 to establish the infrastructure changes in the region 100 and launch the upgraded/new version of the application 199 in that region 100 to production.

In other embodiments, a joint remote DRCS server may be created to propagate the orchestration template 160 deltas to each of the plurality of instances of DRCS 110 in the same cloud. The DRCS 110 instance that received the cloud-push API invocation, in this embodiment, may only invoke a push API for the joint DRCS remote server, which in turn, may invoke the push APIs of the plurality of DRCS 110 instances in the cloud.

In various embodiments, DRCS 110 may receive a push API invocation from another instance of DRCS 110 in the cloud or from a joint DRCS remote server to update the version of the orchestration template 160 in its region 100 and redeploy the application 199 using the received version of the orchestration template 160. DRCS 110 may create the new version of the orchestration template 160 in its region 100, for example by checking-out the region's 100 version of the orchestration template 160 from template repository 165, making the received changes to the orchestration template 160, and checking the new version of the orchestration template 160 back into the template repository 165. DRCS 110 may handle revision control to avoid conflicting orchestration templates 160 updates from occurring locally in its region 100. DRCS 110 may invoke orchestration service 130 to establish the infrastructure changes in region 100 described in the new version of the orchestration template 160 and to launch the upgraded/new version of the application 199 to production.

In various embodiments, DRCS 110 may execute periodically, for example weekly, daily, hourly, or on a schedule set by the cloud owner to determine if any regions 100 in the cloud have updated their versions of orchestration templates 160 for applications 199 deployed in their region 100. DRCS 110 may provide a "cloud-fetch" API that may be invoked by a scheduling service or timer service in the region 100. The DRCS 110 instance receiving the cloud-fetch API invocation may obtain all the active versions of orchestration templates 160 from the plurality of instances of DRCS 110 in the plurality of regions 100 in the same cloud and determine if an application 199 in its region 100 may need to be upgraded and redeployed.

In various embodiments, DRCS 110 may provide an API, for example, "fetch" that returns the active version of an orchestration template 160 for one or more applications 199 deployed in its region 100. In various embodiments, DRCS 110 may register the other instances of DRCS 110 in the cloud as remote instances and issue a fetch API, for example over the cloud network, to the plurality of instances of DRCS 110 executing in the plurality of regions 100 in the same cloud. Any of the plurality of instances of DRCS 110 may periodically issue the fetch API to the other instances of DRCS 110 in the plurality of regions 100 in the same cloud. DRCS 110 may invoke the fetch API of each of the plurality of DRCS 110 instances in the other regions 100 of the cloud, in sequence, to receive each DRCS 110 instance's currently active orchestration templates 160.

Each instance of DRCS 110 that invokes the fetch API may determine if a new version of the orchestration template 160 for the application 199 needs to be created in their region 100, for example by determining if the fetched orchestration template 160 has a larger version number or more current version time stamp. DRCS 110 may create a new version of the orchestration template 160 in its region 100 by checking-out the region's 100 version of the orchestration template 160 from template repository 165, making the changes to the orchestration template 160 based on the changes returned from the fetch API invocation, and checking the new version of the orchestration template 160 back into the template repository 165. DRCS 110 may handle revision control to avoid conflicting orchestration templates 160 updates from occurring locally in its region 100. DRCS 110 may invoke orchestration service 130 to establish the infrastructure changes in region 100 described in the new version of the orchestration template 160 and to launch the upgraded/new version of the application 199 to production.

In other embodiments, a joint remote DRCS server may be created to fetch active versions of the orchestration templates 160 from each of the plurality of instances of DRCS 110 in the same cloud. The DRCS 110 instance that received the cloud-fetch API invocation, in this embodiment, may only invoke a fetch API for the joint DRCS remote server, which in turn, may invoke the fetch APIs of the plurality of DRCS 110 instances in the cloud.

In various embodiments, cloud computing services 110, 120, 130, 140 in region 100 may be physically installed on cloud computing node 122, for example, on a computer readable storage medium, such as computer readable storage medium (media) 430 (FIG. 4), portable computer readable storage medium (media) 470, and/or RAM(S) 422 and each cloud computing service 110, 120, 130, 140 may be represented, for example by a unique identifier, in repository of services 155. In various embodiments, cloud computing services 110, 120, 130, 140 representations may be added to repository of services 155 by coupler service 120.

Repository of services 155 may be locally attached to cloud computing node 122 or may be externally accessed through a network (for example, the Internet, a local area network or other, wide area network or wireless network) and network adapter or interface 436 (FIG. 4). In various embodiments, repository of services 155 may include access information, such as a link or a universal resource locator (URL), to each of the services 110, 120, 130, 140 represented in the repository 155. In various embodiments, repository of services 155 may be, for example, a distributed database that is shared by a plurality of regions 100 on a plurality of computing nodes 122 in the same cloud and may include representations and access information for each cloud computing service 110, 120, 130, 140 in each of the plurality of regions 100 in the same cloud. Repository of services 155 may be any computer readable storage medium, such as computer readable storage medium (media) 530 (FIG. 5), portable computer readable storage medium (media) 570, and/or RAM(S) 522.

In various embodiments, each instance of a coupler service 120 may store a cloud computing service's 110, 120, 130, 140 identification and access information in repository of services 155 when the cloud computing service 110, 120, 130, 140 is launched in its region 100. Coupler service 120 may remove the identification and access information for each cloud computing service 110, 120, 130, 140 from repository of services 155 when the service 110, 120, 130, 140 is removed from the region 100. Coupler service 120 may include its own identifier and access information in repository of services 155. In certain embodiments, cloud computing services 110, 120, 130, 140 may register and deregister with coupler service 120 in order to be added and removed from repository of services 155. In various embodiments, coupler service 120 may use repository of services 155 to determine if a cloud computing service 110, 120, 130, 140 has been launched in another region 100 in the same cloud and may retrieve the access information to enable a cloud computing services 110, 120, 130, 140 launched in its region 100 to communicate with one or more instances of the cloud computing services 110, 120, 130, 140 in any of the plurality of regions 100 in the same cloud.

DRCS 110 may utilize coupler service 120 to retrieve the access information to other instances of DRCS 110 in the other regions 100 in the cloud prior to invoking a push or fetch API to those instances of DRCS 110, thus dynamically scaling as regions 100 with instances of DRCS 110 are added to or removed from the cloud between API invocations.

Cloud computing node 122 represents a computing device, system or environment, and may be a laptop computer, notebook computer, personal computer (PC), desktop computer, tablet computer, thin client, mobile phone or any other electronic device or computing system capable of performing the required functionality of embodiments of the disclosure. Cloud computing node 122 may include internal and external hardware components, as depicted and described in further detail with respect to FIG. 4. In other various embodiments of the present disclosure, cloud computing node 122 may represent a computing system utilizing clustered computers and components to act as a single pool of seamless resources. In general, cloud computing node 122 is representative of any programmable electronic devices or combination of programmable electronic devices capable of executing machine-readable program instructions in accordance with an embodiment of the disclosure.

Figure 2:
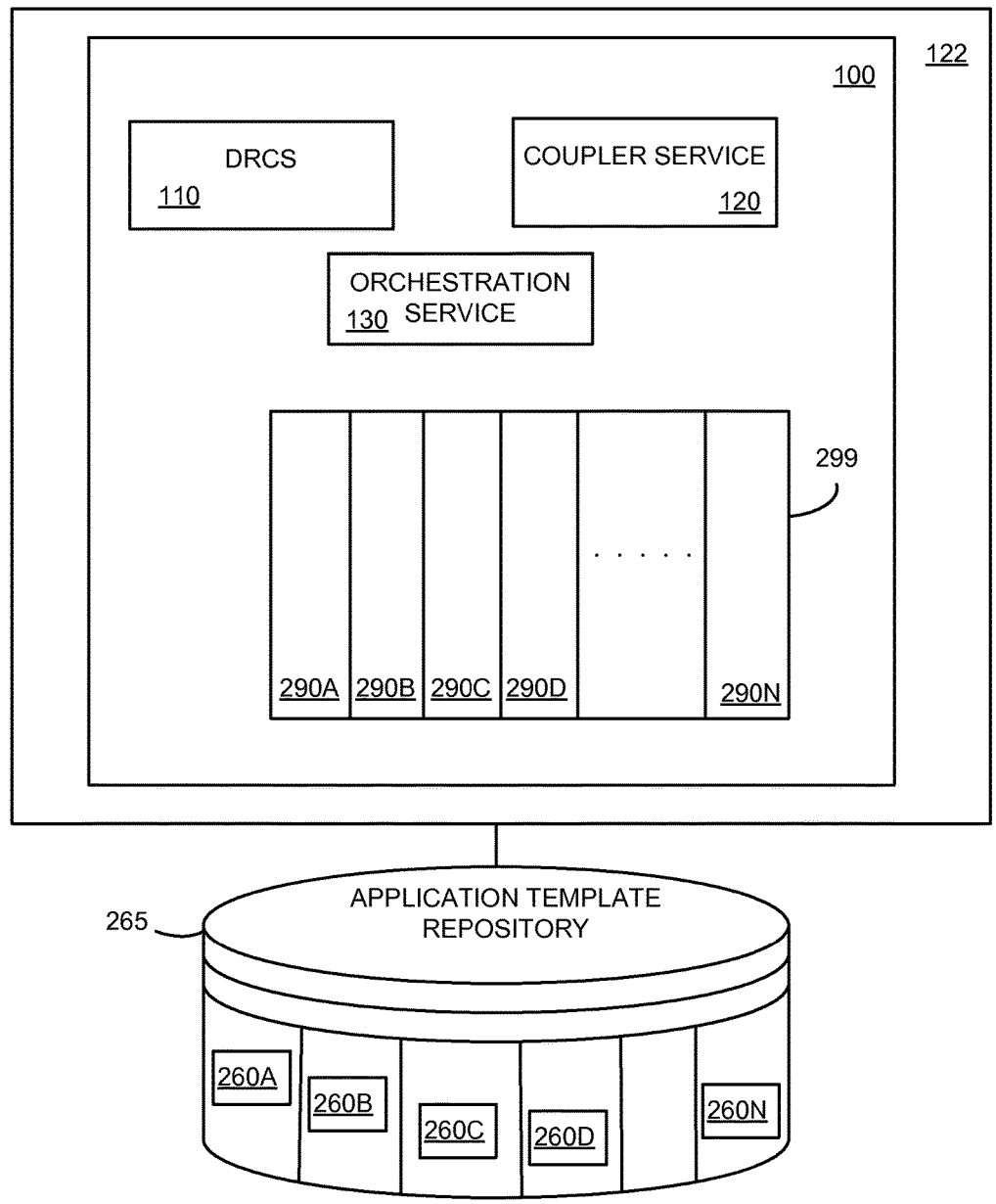
FIG. 2 depicts an exemplary region with a multi-tenant application, in accordance with an embodiment of the disclosure.

FIG. 2 depicts an exemplary region 100 with a deployed multi-tenant application 299, in accordance with an embodiment of the disclosure. In various embodiments, a deployed instance of multi-tenant application 299 may include a plurality of tenants 290A, 290B, 290C, 290D . . . 290N, each of which may be deployed with a different version of a tenant orchestration template 260A, 260B, 260C, 260D . . . 260N for the application 299. In various embodiments, one or more tenants 290 may be deployed with a production version of the tenant orchestration template 260, while other tenants 290 may be deployed with a test version of the tenant orchestration template 260. In various embodiments, DRCS 110 may connect to an application template repository 265 specific to the multi-tenant application 299.

In various embodiments, application template repository 265 may include the versions of the tenant orchestration template 260 corresponding to each deployed tenant 290 in the instance of the multi-tenant application 299 in the region 100.

Application template repository 265 may be, for example, a computer readable storage medium, such as computer readable storage medium (media) 430 (FIG. 4), portable computer readable storage medium (media) 470, and/or RAM(S) 422. Application template repository 265 may be locally attached to cloud computing node 122 or may be externally accessed through a network (for example, the Internet, a local area network or other, wide area network or wireless network) and network adapter or interface 436 (FIG. 4). The network may comprise copper wires, optical fibers, wireless transmission, routers, firewalls, switches, gateway computers, and/or edge servers.

In various embodiments, DRCS 110 may recognize the varying versions of tenant orchestration templates 260 in use by the tenants 290 in the application 299 when a new version of an orchestration template 160 is to be deployed in its region 100. DRCS 110 may update each tenant orchestration template 260 based on each tenant's orchestration template's 260 current version.

In various embodiments, DRCS 110 may determine that certain deployed tenants 290, for example, test tenants, should not be automatically redeployed with the new version of the orchestration template 160. In certain embodiments, tenant orchestration templates 260 may include indicators that DRCS 110 may recognize to determine that a particular tenant 290 is not to be automatically redeployed.

Figure 3:
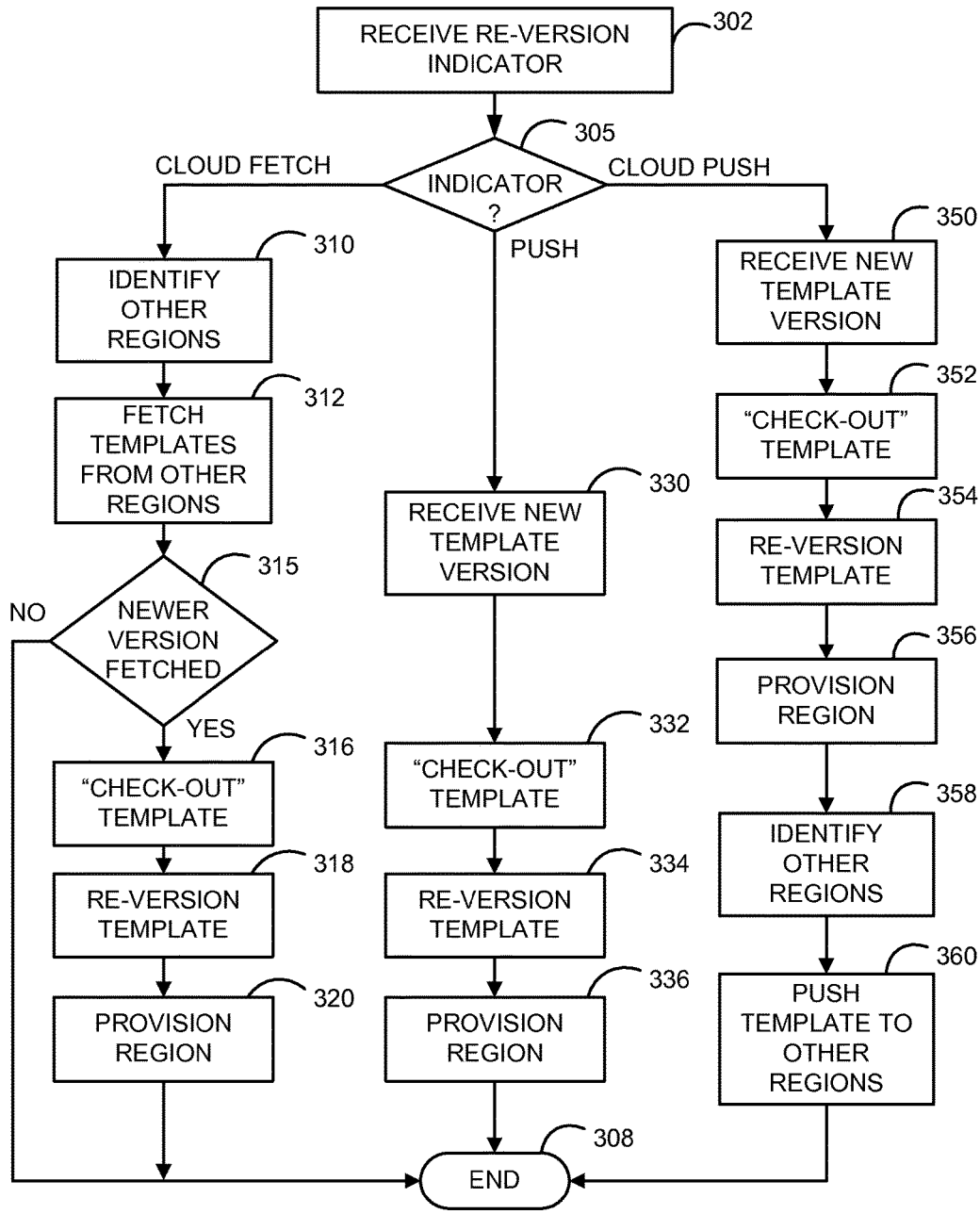
FIG. 3 is a flowchart illustrating distributed revision control, in accordance with an embodiment of the disclosure.

FIG. 3 is a flowchart illustrating distributed revision control, in accordance with an embodiment of the disclosure. In various embodiments, an instance of DRCS 110 in a region 100 may receive an indicator, at 302, that a new version of the orchestration template 160 for an application 199 in its region 100 may be available. The indicator may result from, for example, a timer driven cloud-fetch API invocation (to determine if another region 100 in the cloud has a newer version of the orchestration template 160), a push API invocation from an instance of DRCS 110 in another region 100 in the same cloud (which includes a newer version of the orchestration template 160 from that region 100), or a cloud-push API invocation (which includes a new version of the orchestration 160 to propagate to all regions 100 in the same cloud).

If DRCS 110 receives a cloud-fetch API invocation, as determined at 305, DRCS 110 may at 310, communicate with coupler service 120 to identify the other instances of DRCS 110 in the other regions 100 in the cloud. DRCS 110 may invoke the fetch API, at 312, to each of the other instances of DRCS 110 in the cloud to retrieve the active version of the orchestration template 160 in their regions 100. If any of the retrieved versions of the orchestration template 160 are newer than the version in the invoking DRCS's 110 region 100, as determined at 315, the invoking DRCS 110 may check its version of the orchestration template out 160 of the template repository 165, at 316, re-version the orchestration template 160 by checking in the retrieved new version to the template repository 165, at 318, and pass the re-versioned orchestration template 160 to orchestration service 130, at 320, to provision the region 100 using the re-versioned orchestration template 160. DRCS 110 processing then ends at 308. If none of the retrieved versions of the orchestration template 160 are newer than the version in the invoking DRCS's 110 region 100, as determined at 315, processing ends at 308.

If DRCS 110 receives a push API invocation from another instance of DRCS 110 in another region 100, as determined at 305, DRCS 110 may at 330, receive the new version of the orchestration template 160 passed as part of the push API. DRCS 110 may check its version of the orchestration template 160 out of the template repository 165, at 332, re-version the orchestration template 160 by checking in the version of the orchestration template 160 received with the push API to the template repository 165, at 334, and pass the re-versioned orchestration template 160 to orchestration service 130, at 336, to provision the region 100 using the re-versioned orchestration template 160. DRCS 110 processing then ends at 308.

If DRCS 110 receives a cloud-push API invocation to propagate a new version of the orchestration template 160 to all the instances of DRCS 110 in the cloud, as determined at 305, DRCS 110 may at 350, receive the new version of the orchestration template 160 passed as part of the cloud-push API. DRCS 110 may check its version of the orchestration template 160 out of the template repository 165, at 352, re-version the orchestration template 160 by checking in the version of the orchestration template 160 received with the cloud-push API to the template repository 165, at 354, and pass the re-versioned orchestration template 160 to orchestration service 130, at 356, to provision the region 100 using the re-versioned orchestration template 160. DRCS 110 may, at 358, communicate with coupler service 120 to identify the other instances of DRCS 110 in the other regions 100 in the cloud in order to propagate the new version of the orchestration template 160 to all the region 100 in the cloud. DRCS 110 may invoke the push API, at 360, in each of the other instances of DRCS 110 in the cloud, including the new version of the orchestration template 160 in the API invocation. DRCS 110 processing then ends at 308.

FIG. 4 depicts a block diagram of components of the computing device 122 of FIG. 1, in accordance with an embodiment of the disclosure. It should be appreciated that FIG. 4 provides only an illustration of one implementation and does not imply any limitations with regard to the environments in which different embodiments may be implemented. Many modifications to the depicted environment may be made.

Computing device 122 can include one or more processors 420, one or more computer-readable RAMs 422, one or more computer-readable ROMs 424, one or more computer readable storage medium 430, 155, 165, 265, device drivers 440, read/write drive or interface 432, and network adapter or interface 436, all interconnected over a communications fabric 426. Communications fabric 426 can be implemented with any architecture designed for passing data and/or control information between processors (such as microprocessors, communications and network processors, etc.), system memory, peripheral devices, and any other hardware components within a system.

One or more operating systems 428, cloud computing services 110, 120, 130, 140, deployed cloud applications 199, 299, 290, repository of services 155, template repositories 165, application template repositories 265, orchestration templates 160, and tenant orchestration templates 260 are stored on one or more of the computer-readable storage medium 430, 155, 165, 265 for execution by one or more of the processors 420 via one or more of the respective RAMs 422 (which typically include cache memory). In the illustrated embodiment, each of the computer readable storage medium 430, 155, 165, 265 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer readable storage medium that can store a computer program and digital information.

Computing device 122 can also include a R/W drive or interface 432 to read from and write to one or more portable computer readable storage medium 470, 155, 165, 265. Cloud computing service 110, 120, 130, 140, deployed cloud application 199, 299, 290, repository of services 155, template repository 165, application template repository 265, orchestration template 160, and tenant orchestration template 260 can be stored on one or more of the portable computer readable storage medium 470, 155, 165, 265 read via the respective R/W drive or interface 432, and loaded into the respective computer readable storage medium 430, 155, 165, 265.

Computing device 122 can also include a network adapter or interface 436, such as a TCP/IP adapter card or wireless communication adapter (such as a 4G wireless communication adapter using OFDMA technology). Cloud computing service 110, 120, 130, 140, deployed cloud application 199, 299, 290, repository of services 155, template repository 165, application template repository 265, orchestration template 160, and tenant orchestration template 260 can be downloaded to the computing device from an external computer or external storage device via a network (for example, the Internet, a local area network or other, wide area network or wireless network) and network adapter or interface 436. From the network adapter or interface 436, the programs are loaded into the computer readable storage medium 430, 155, 165, 265. The network may comprise copper wires, optical fibers, wireless transmission, routers, firewalls, switches, gateway computers, and/or edge servers.

Computing device 122 can also include a display screen 450, a keyboard or keypad 460, and a computer mouse or touchpad 455. Device drivers 440 interface to display screen 450 for imaging, to keyboard or keypad 460, to computer mouse or touchpad 455, and/or to display screen 450 for pressure sensing of alphanumeric character entry and user selections. The device drivers 440, R/W drive or interface 432, and network adapter or interface 436 can comprise hardware and software (stored in computer readable storage medium 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 5:
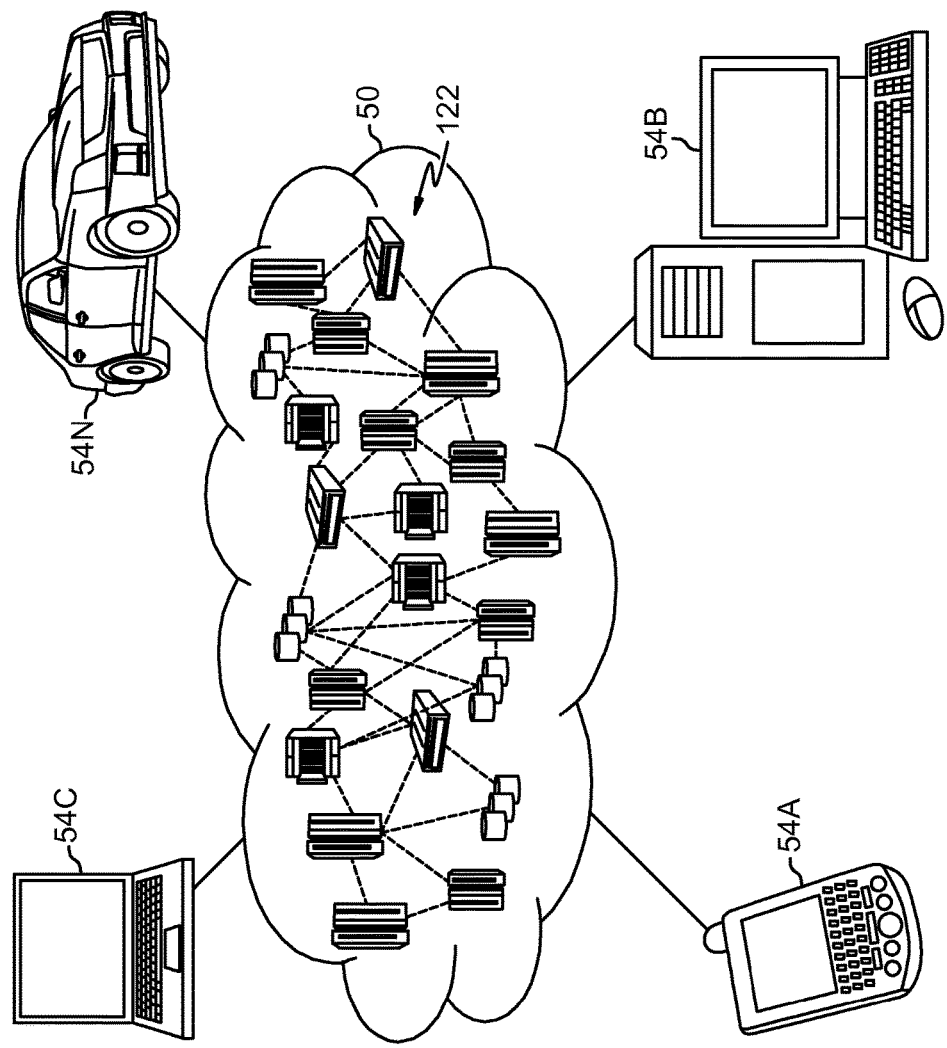
FIG. 5 depicts a cloud computing environment including the computing device of FIGS. 1 and 4, in accordance with an embodiment of the disclosure.

FIG. 5 depicts a cloud computing environment 50 including the computing device 122 of FIGS. 1 and 4, in accordance with an embodiment of the disclosure. As shown, cloud computing environment 50 comprises one or more cloud computing nodes 122 with which local computing devices used by cloud consumers, such as, for example, personal digital assistant (PDA) or cellular telephone 54A, desktop computer 54B, laptop computer 54C, and/or automobile computer system 54N may communicate. Nodes 122 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing devices 122 and cloud computing environment 50 can communicate with any type of computerized device over any type of network and/or network addressable connection (e.g., using a web browser).

Figure 6:
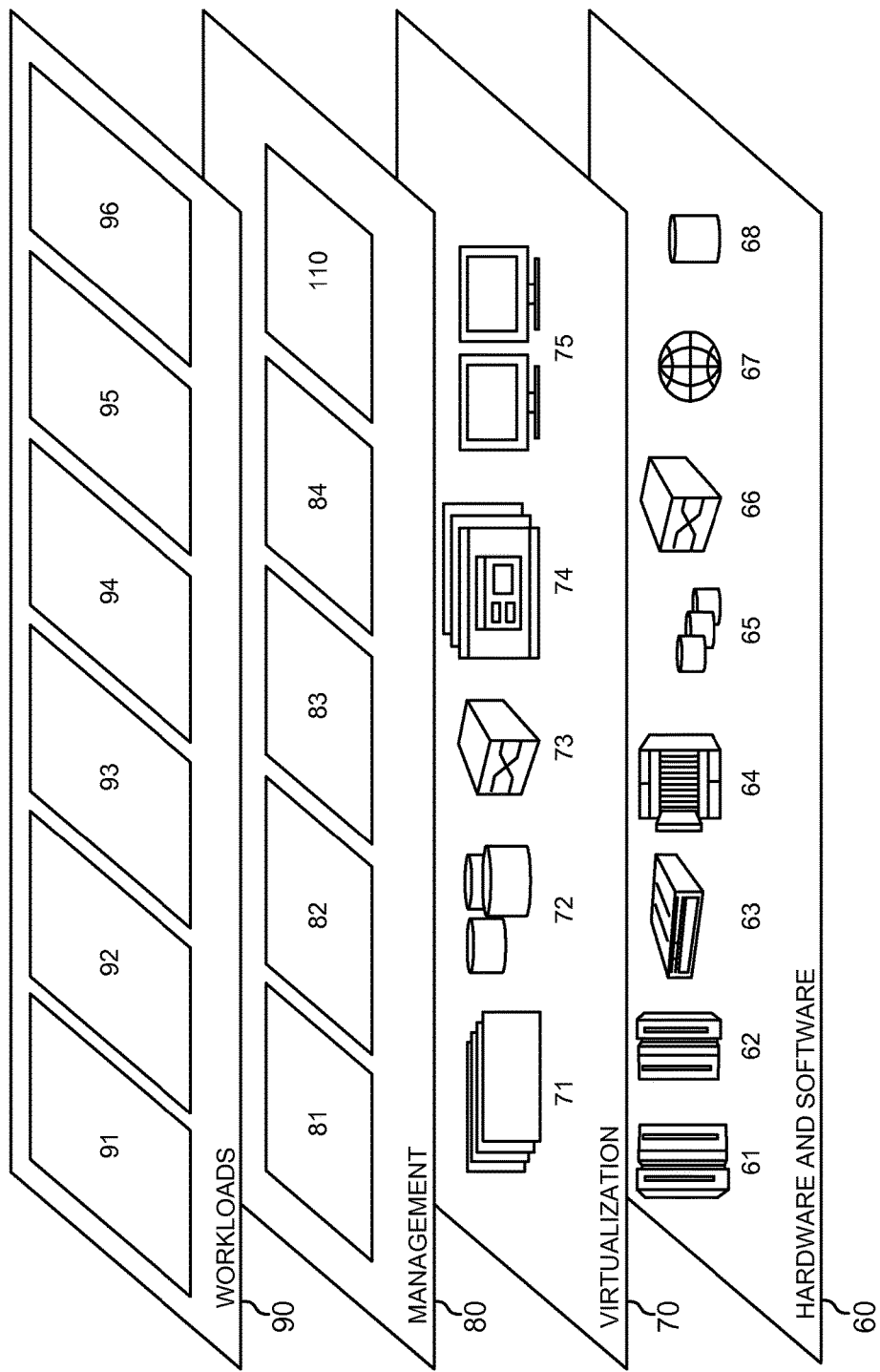
FIG. 6 depicts a block diagram of functional layers of the cloud computing environment of FIG. 5, in accordance with an embodiment of the disclosure.

FIG. 6 depicts a block diagram of functional layers of the cloud computing environment 50 of FIG. 5, in accordance with an embodiment of the disclosure. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Distributed revision control service 110 provides management of life-cycle documents in the cloud and deployment of a consistent version of an application across the cloud.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop processing 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for distributed version control in a multi-region cloud, each region in the multi-region cloud including an instance of a version control service, the method comprising:

receiving an indicator, by a first version control service in a first cloud region of a multi-region cloud, that a document saved in the first cloud region is to be re-versioned due to a creation of a new version of the document in the first cloud region or due to receiving a new version of the document from a second version control service;

based on the indicator indicating the document saved in the first cloud region is to be re-versioned due to the creation of the new version of the document in the first cloud region:

re-versioning, by the first version control service, the document saved in the first cloud region by saving the new version of the document in the first cloud region;

identifying, by the first version control service, access information to the second version control service in a second cloud region of the multi-region cloud, the access information located in a repository of services; and transmitting, by the first version control service to the second version control service, the new version of the document; and based on the indicator indicating the document saved in the first cloud region is to be re-versioned due to receiving the new version of the document from the second version control service in the second cloud region of the multi-region cloud:

re-versioning, by the first version control service, the document saved in the first cloud region by saving the received new version of the document in the first cloud region.

2. The method according to claim 1, further comprising:

based on the indicator indicating the document saved in the first cloud region is to be re-versioned due to receiving the new version of the document from the second version control service in the second cloud region:

identifying, by the first version control service, access information to the second version control service in the second cloud region of the multi-region cloud; and obtaining, by the first version control service from the second version control service, the document saved in the second cloud region, wherein the indicator indicating the document saved in the first cloud region is to be re-versioned results from a timer driven cloud-fetch application programming interface invocation, a push application programming interface invocation, or a cloud-push application programming interface invocation.

3. The method according to claim 1, wherein the document is an orchestration template, the orchestration template describing infrastructure resources for deployment of an application, relationships between resources, and cloud computing services required for the application, wherein the orchestration template is a text file.

4. The method according to claim 3, further comprising:

passing, by the first version control service, the re-versioned orchestration template to an orchestration service in the first control region, whereby the orchestration service provisions the first control region based on the passed orchestration template;

identifying other instances of version control services in other cloud regions; and propagating the re-versioned orchestration template to all other cloud regions.

5. The method according to claim 1, wherein the first version control service utilizes a check-in protocol and a check-out protocol to re-version the document saved in the first cloud region.

6. The method according to claim 1, wherein transmitting, by the first version control service to the second version control service comprises invoking, by the first version control service, an application programming interface in the second version control service.

7. The method according to claim 2, wherein obtaining, by the first version control service from the second version control service, the document saved in the second cloud region comprises invoking, by the first version control service, an application programming interface in the second version control service.

8. The method according to claim 2, wherein receiving the indicator indicating the document saved in the first cloud region is to be re-versioned due to receiving the new version of the document from the second version control service is a timed event or a scheduled event occurring on a weekly basis, a daily basis, an hourly basis, or on a schedule set by a cloud owner.

9. A computer program product for distributed version control in a multi-region cloud, each region in the multi-region cloud including an instance of a version control service, the computer program product comprising one or more computer readable storage medium and program instructions stored on at least one of the one or more computer readable storage medium, the program instructions comprising:

program instructions to receive an indicator, by a first version control service in a first cloud region of a multi-region cloud, that a document saved in the first cloud region is to be re-versioned due to a creation of a new version of the document in the first cloud region or due to receiving a new version of the document from a second version control service;

based on the indicator indicating the document saved in the first cloud region is to be re-versioned due to the creation of the new version of the document in the first cloud region:

program instructions to re-version, by the first version control service, the document saved in the first cloud region by saving the new version of the document in the first cloud region;

program instructions to identify, by the first version control service, access information to the second version control service in a second cloud region of the multi-region cloud, the access information located in a repository of services; and program instructions to transmit, by the first version control service to the second version control service, the new version of the document; and based on the indicator indicating the document saved in the first cloud region is to be re-versioned due to receiving the new version of the document from the second version control service in the second cloud region of the multi-region cloud:

program instructions to re-version, by the first version control service, the document saved in the first cloud region by saving the received new version of the document in the first cloud region.

10. The computer program product according to claim 9, further comprising:

based on the indicator indicating the document saved in the first cloud region is to be re-versioned due to receiving the new version of the document from the second version control service in the second cloud region:
- program instructions to identify, by the first version control service, access information to the second version control service in the second cloud region of the multi-region cloud; and
- program instructions to obtain, by the first version control service from the second version control service, the document saved in the second cloud region,
- wherein the indicator indicating the document saved in the first cloud region is to be re-versioned results from a timer driven cloud-fetch application programming interface invocation, a push application programming interface invocation, or a cloud-push application programming interface invocation.

11. The computer program product according to claim 9, wherein the document is an orchestration template, the orchestration template describing infrastructure resources for deployment of an application, relationships between resources, and cloud computing services required for the application, wherein the orchestration template is a text file.

12. The computer program product according to claim 11, further comprising:
- program instructions to pass, by the first version control service, the re-versioned orchestration template to an orchestration service in the first control region, whereby the orchestration service provisions the first control region based on the passed orchestration template;
- program instructions to identify other instances of version control services in other cloud regions; and
- program instructions to propagate the re-versioned orchestration template to all other cloud regions.

13. The computer program product according to claim 9, wherein the first version control service utilizes a check-in protocol and a check-out protocol to re-version the document saved in the first cloud region.

14. The computer program product according to claim 10, wherein the program instructions that receive the indicator indicating the document saved in the first cloud region is to be re-versioned due to receiving the new version of the document from the second version control service execute as a timed event or a scheduled event occurring on a weekly basis, a daily basis, an hourly basis, or on a schedule set by a cloud owner.

15. A computer system for distributed version control in a multi-region cloud, each region in the multi-region cloud including an instance of a version control service, the computer system comprising one or more processors, one or more computer readable memories, one or more computer readable tangible storage medium, and program instructions stored on at least one of the one or more storage medium for execution by at least one of the one or more processors via at least one of the one or more memories, the program instructions comprising:
- program instructions to receive an indicator, by a first version control service in a first cloud region of a multi-region cloud, that a document saved in the first cloud region is to be re-versioned due to a creation of a new version of the document in the first cloud region or due to receiving a new version of the document from a second version control service;
- based on the indicator indicating the document saved in the first cloud region is to be re-versioned due to the creation of the new version of the document in the first cloud region:
  - program instructions to re-version, by the first version control service, the document saved in the first cloud region by saving the new version of the document in the first cloud region;
  - program instructions to identify, by the first version control service, access information to the second version control service in a second cloud region of the multi-region cloud, the access information located in a repository of services; and
  - program instructions to transmit, by the first version control service to the second version control service, the new version of the document; and
- based on the indicator indicating the document saved in the first cloud region is to be re-versioned due to receiving the new version of the document from the second version control service in the second cloud region of the multi-region cloud:
  - program instructions to re-version, by the first version control service, the document saved in the first cloud region by saving the received new version of the document in the first cloud region.

16. The computer system according to claim 15, further comprising:
- based on the indicator indicating the document saved in the first cloud region is to be re-versioned due to receiving the new version of the document from the second version control service in the second cloud region:
  - program instructions to identify, by the first version control service, access information to the second version control service in the second cloud region of the multi-region cloud; and
  - program instructions to obtain, by the first version control service from the second version control service, the document saved in the second cloud region, wherein the indicator indicating the document saved in the first cloud region is to be re-versioned results from a timer driven cloud-fetch application programming interface invocation, a push application programming interface invocation, or a cloud-push application programming interface invocation.

17. The computer system according to claim 15, wherein the document is an orchestration template, the orchestration template describing infrastructure resources for deployment of an application, relationships between resources, and cloud computing services required for the application, wherein the orchestration template is a text file.

18. The computer system according to claim 17, further comprising:
- program instructions to pass, by the first version control service, the re-versioned orchestration template to an orchestration service in the first control region, whereby the orchestration service provisions the first control region based on the passed orchestration template;
- program instructions to identify other instances of version control services in other cloud regions; and
- program instructions to propagate the re-versioned orchestration template to all other cloud regions.

19. The computer system according to claim 15, wherein the first version control service utilizes a check-in protocol and a check-out protocol to re-version the document saved in the first cloud region.

20. The computer system according to claim 16, wherein the program instructions that receive the indicator indicating the document saved in the first cloud region is to be re-versioned due to receiving the new version of the document from the second version control service execute as a timed event or a scheduled event occurring on a weekly basis, a daily basis, an hourly basis, or on a schedule set by a cloud owner.

* * * * *